Feb. 12, 1924.
W. H. PRINCE
1,483,196
SANITARY WRAPPER FOR ICE CREAM CONTAINERS
Filed June 26, 1922
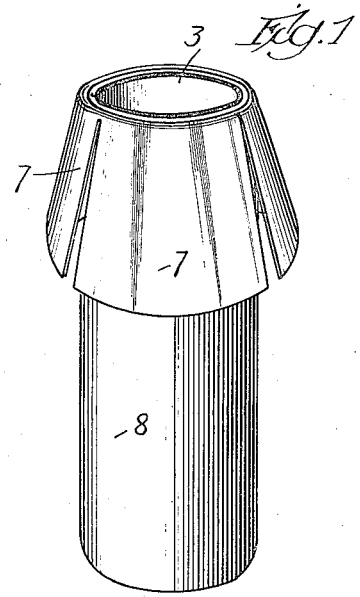
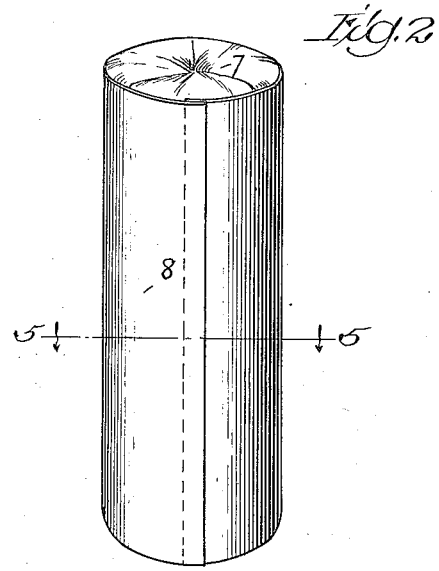
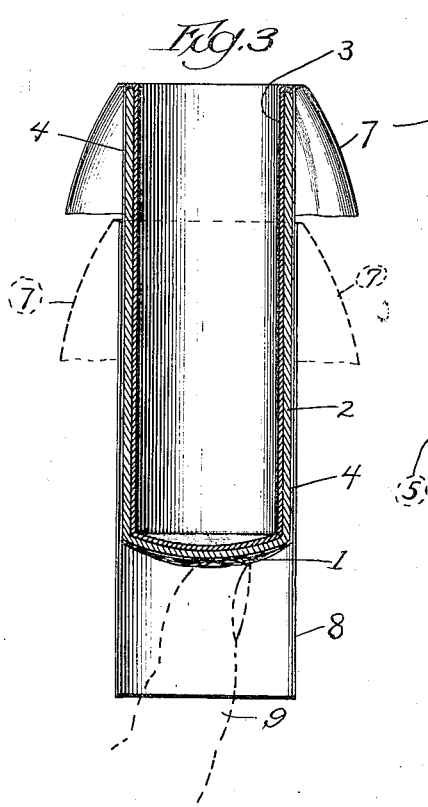
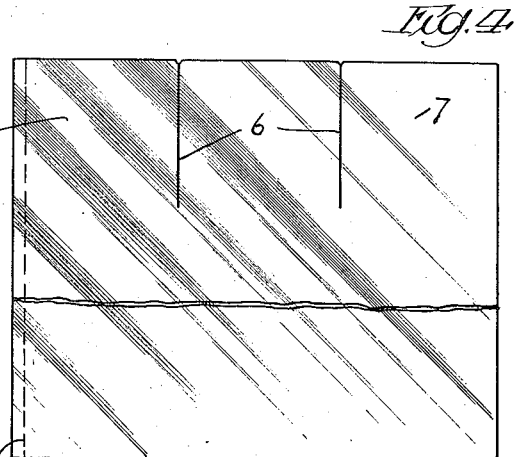
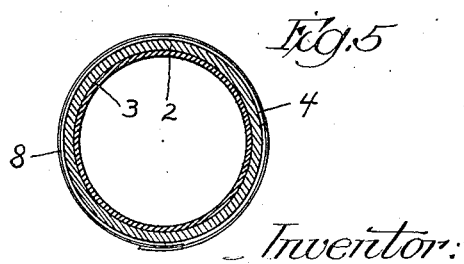
Inventor:
William H. Prince
by Albert Scheibli, Attorney Patented Feb. 12, 1924.

1,483,196

UNITED STATES PATENT OFFICE.

WILLIAM H. PRINCE, OF MINNEAPOLIS, MINNESOTA.

SANITARY WRAPPER FOR ICE-CREAM CONTAINERS.

Application filed June 26, 1922. Serial No. 570,911.

*To all whom it may concern:*

Be it known that I, WILLIAM H. PRINCE, citizen of Austria, residing at Minneapolis, in the county of Hennepin and State of Minnesota, have invented certain new and useful Improvements in a Sanitary Wrapper for Ice-Cream Containers; and I do hereby declare the following to be a full, clear, and exact description of the invention, such as will enable others skilled in the art to which it appertains to make and use the same.

My invention relates to wrappers adapted for either partially or entirely inclosing edible articles, and in some of its general aspects aims to provide a simple, sanitary and inexpensive wrapping which can easily be applied to an article of given dimensions for entirely housing the same, which can readily have certain portions of the wrapping turned back to expose one end of the said article, and which will also permit certain parts of the wrapper to be gradually removed for exposing the wrapped object to an increasing extent during the handling thereof while continually preventing contact of the hands with the wrapped object. Furthermore, my invention aims to provide a wrapping for this purpose comprising an inner wrapper adapted to be manipulated for exposing the wrapped object to an increasing extent, and an outer wrapper which normally holds the inner wrapper in position and within which the object surrounded by the inner wrapper is freely slidable.

In one of its immediate commercial aspects, my invention is particularly adapted for providing means for preventing edible ice cream containers from being touched either by the hands of the dealers who fill such containers with ice cream, or by the hand of the purchaser, and for also preventing any stray particles of either the ice cream or the container from contacting with the hands of the person who is eating the same.

While a container made of a cake-like material, such as that used in the making of socalled ice cream cones, makes a highly palatable article of food when gradually consumed jointly with the ice cream housed by the same, the use of such cones has heretofore been objectionable because of the direct handling of the same by the soda fountain clerks or other dispensers and also because of the tendency of the melting ice cream to run down upon the hands of the party who is consuming the cone. Furthermore, the materials employed for the edible container have heretofore been limited in range, owing to the fact that these containers must not stick to each other even in warm weather when closely nested or otherwise packed and that they must have outer surface portions which can be freely handled by the consumer even in warm weather or in well heated rooms. Consequently, the use of suitable flavoring coatings, such as chocolate, has been barred, thereby preventing a large portion of the buying public from getting the favorite flavoring taste in an article of this class. My present invention also aims to overcome this limitation by permitting the ready use of any desired container coatings.

As here presented, my invention forms one step in a novel series of provisions whereby I am enabling completely filled edible containers to be furnished with any desired flavoring coating and to be manipulated both prior to their retail sale and during the consumption of the duly filled containers without having the hands of any person touch the same. As one step in the series of inventions which I have made for this purpose, I am disclosing a novel form of easily filled and suitably coated edible container in my copending application No. 570,910, filed June 26, 1922. I am disclosing a holder specially designed for supporting the containers during the filling thereof. Since the container wrapping of my present invention is particularly suitable for use in connection with the disclosures of my said copending applications, I am herewith illustrating and describing the same in such a connection, although I do not wish to be limited either as to the form or manufacture of the articles which are to be housed by my here disclosed wrapping, nor as to the appliances used in connection with the filling of the edible objects which are to be wrapped.

Other and more detailed objects will also appear from the following specification and from the accompanying drawings, in which—

Fig. 1 is a perspective view showing a wrapping embodying my invention and applied to an edible and substantially cup-shaped and chocolate lined ice cream container, this figure showing the upper portion of the inner wrapper as turned back to expose the mouth of the container prior to the filling of the latter.

Fig. 2 is a similar view showing the wrapper with the previously turned back portions intertwined to close the mouth of the container.

Fig. 3 is a central and longitudinal section through the duly wrapped container as it appears when the extension portions of the inner wrapper are turned back and when the container surrounded by this inner wrapper is slid to some extent out of the outer wrapper.

Fig. 4 is a plan view of the blank from which the inner wrapper is formed.

Fig. 5 is a transverse section through the duly wrapped container, taken along the correspondingly numbered line in Fig. 2.

In the embodiment of the drawings, the wrapping of my invention is shown as applied to a substantially cup shaped container. having a rounded bottom 1 and a tubular side wall portion 2, and having a relatively thin lining 3 of chocolate upon its interior. Rolled around the said container is an inner wrapper 4 which desirably is made of a waxed or other moisture-impervious paper. This wrapper is rolled up from a blank whose length is slightly greater than the circumference of the container, so that the ends of the original blank will overlap somewhat when the latter is rolled about the container, as for example by overlapping to the extent shown by the dotted line 5 in Fig. 4. The blank from which the wrapper is formed is considerably taller than the height of the container, so that the lower portion of the same can be folded upon itself under the bottom 1 of the container while the upper portion of the blank projects for a considerable distance above the top of the container.

This upper portion is provided with slits 6 which extend at least down to the top of the container when the latter is surrounded by this inner wrapper and which afford separate tongues or flaps 7 adapted to be folded outwardly and downwardly so as to expose the mouth of the container after the manner of Figs. 1 and 3. After the inner wrapper 4 has been rolled around the container and has had its lower end tucked under the bottom of the container, I secure this inner wrapper in place by means of an outer wrapper 8 which desirably consists of a sheet of paper wrapped around the inner wrapper and having its longitudinal edges pasted to each other in overlapping disposition after the manner shown in Fig. 2. This outer wrapper 8 then forms a tube and the said pasting makes this tube laterally closed, so that it holds the inner wrapper in its normal position close to the container. However, the outer wrapper (which need not be of waxed paper and which may have any desired ornamentation or advertising legend upon the same) is not pasted to the inner wrapper, but leaves the latter together with the container housed thereby freely slidable within the tube constituted by the upper wrapper. In practice, the side wall of the container is desirably slightly tapered so as to facilitate the filling of the same after the manner described in my said copending applications, and the affixing of the two wrappers then affords a corresponding slight taper in these wrappers. However, it still permits the ready sliding of the inner-wrapped container upwardly with respect to the outer wrapper by the finger 9 of the consumer, after the manner shown in dotted lines in Fig. 3.

With the wrappings as thus described, it will be evident from the drawings that the baked containers can readily be wrapped initially after the manner of Fig. 2 so as to be supplied to the soda fountains in an entirely wrapped condition in which the wrappings prevent both contact of the hands with the container and a sticking of the containers to each other. When the container is to be filled, the extension flaps 7 of the inner wrapper are folded back as shown in Fig. 1, thereby freely exposing the mouth of the container while still leaving the side and bottom of the latter entirely wrapped to permit of sanitary handling. When the container and the ice cream within the same is to be eaten, the user gradually slides the inner-wrapped container upwardly within the outer wrapper after the manner of Fig. 3 and gradually extends the slit 6 downwardly by pulling on the ends of the flaps 7 after the general manner of peeling a banana. In doing so, he gradually exposes more and more of the container and of the corresponding portion of the ice cream or other filling within the latter, so that these can readily be consumed without having his hands touch the same.

Furthermore, in case there should be any tendency of the melting ice cream or other container filler to drip, this will be caught by the flaps 7 which cooperate in forming a sort of hood over the hand of the party holding the container. My simple, easily manipulated and quite inexpensive arrangement therefore provides that highly desirable sanitary wrapping for the lack of which the consumption of edible and ice-cream filled containers has long been restricted largely to children. Moreover, while housing the container, the wrapping effectively shields the surface portions of the container from contact with any other objects. Consequently, the container itself may have a surface portion of any desired consistency, as the duly wrapped containers can readily be packed or stacked close to each other without the possibility of their sticking to one another even in quite warm weather.

However, while I have illustrated and described my invention in an embodiment suitable for a particular shape of container and including a highly desirable arrangement of the divisions between the projecting tongues at the top of the inner wrapper, and have likewise described it as including an outer wrapper in the form of a thin paper tube, I do not wish to be limited to these or other details of the construction and arrangement thus disclosed, it being obvious that the same might be modified in many ways without departing either from the spirit of my invention or from the appended claims.

I claim as my invention:—

1. A wrapping for an edible container comprising an inner wrapper normally entirely housing the container and formed for permitting one end thereof to be turned outwardly to freely expose the mouth of the container, and an outer wrapper open at both ends and in which the container when housed by the inner wrapper is freely slidable.

2. A wrapping for an edible container comprising an inner wrapper normally entirely housing the container and formed for permitting one end thereof to be turned outwardly to freely expose the mouth of the container, and an outer wrapper open at both ends and in which the container when housed by the inner wrapper is freely slidable, the outer wrapper being a laterally closed tube, and the inner wrapper being formed from a sheet wrapped around the container and held adjacent to the latter by the outer wrapper.

3. A wrapping for an edible container comprising a wrapper laterally confining the container and underhanging the bottom thereof and having a slitted portion extending beyond the top of the container and adapted to be adjoined to close the mouth of the container, the slits in the said extending portion permitting the parts of the latter to be separately bent outwardly to freely expose the mouth of the container when the container is to be filled.

4. A wrapping for an edible container, comprising a wrapper laterably confining the container and underhanging the bottom thereof and having a slitted portion extending beyond the top of the container and adapted to be adjoined to close the mouth of the container, the slits in the said extending portion permitting the parts thereof to be separately bent outwardly to freely expose the mouth of the container when the container is to be filled; and an outer wrapper surrounding the portion of the aforesaid wrapper which is normally laterally adjacent to the container, the outer wrapper being open at both ends.

5. A wrapping for an edible container, comprising a sheet of waxed paper housing the sides and bottom of the container, and means for holding the sheet in such housing disposition, the sheet having a portion projecting upwardly beyond the mouth of the container and the said portion having slits extending from its upper edge down to the top of the container.

6. A wrapping for an edible container, comprising a sheet of waxed paper housing the sides and bottom of the container, and means for holding the sheet in such housing disposition, the sheet having a portion projecting upwardly beyond the mouth of the container and the said portion being divided into separate tabs adapted either to be adjoined for closing the mouth of the container or to be turned down separately upon the exterior of the wrapping to expose the mouth of the container.

7. A wrapping for an edible container, comprising a sheet housing the sides and bottom of the container, and means for normally holding the sheet in such housing disposition, the sheet having a portion projecting upwardly beyond the mouth of the container and the said portion being divided by slits into parts adapted to be separately turned outwardly and downwardly to expose the mouth of the container, the sheet being of a manually rupturable material to permit the slits therein to be extended by pulling downwardly on the said parts.

Signed at Chicago, Illinois, June 3rd, 1922.

WILLIAM H. PRINCE.